United States Patent
Sham et al.

(10) Patent No.: US 12,039,757 B2
(45) Date of Patent: Jul. 16, 2024

(54) ASSOCIATING LABELS BETWEEN MULTIPLE SENSORS

(71) Applicant: Waymo LLC, Mountain View, CA (US)

(72) Inventors: Jeffrey Sham, San Jose, CA (US); Yulai Shen, Sunnyvale, CA (US); Sandro Alighiero Young, Mountain View, CA (US); Gen Liu, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 427 days.

(21) Appl. No.: 17/565,847

(22) Filed: Dec. 30, 2021

(65) Prior Publication Data

US 2023/0215044 A1  Jul. 6, 2023

(51) Int. Cl.
*G06T 7/80* (2017.01)
*G06N 3/08* (2023.01)

(52) U.S. Cl.
CPC ............... *G06T 7/80* (2017.01); *G06N 3/08* (2013.01); *G06T 2207/20081* (2013.01); *G06T 2207/20084* (2013.01); *G06T 2207/30252* (2013.01)

(58) Field of Classification Search
CPC ............ G06T 7/80; G06T 2207/20081; G06T 2207/20084; G06T 2207/30252; G06N 3/08; G06N 20/00; G06V 10/24; G06V 20/56
See application file for complete search history.

(56) References Cited

U.S. PATENT DOCUMENTS

| | | | |
|---|---|---|---|
| 9,221,396 B1 | 12/2015 | Zhu et al. | |
| 9,555,740 B1 | 1/2017 | Zhu et al. | |
| 9,904,867 B2 | 2/2018 | Fathi | |
| 9,911,030 B1 | 3/2018 | Zhu et al. | |
| 10,169,678 B1 * | 1/2019 | Sachdeva | G06V 10/7788 |
| 10,438,371 B2 | 10/2019 | Xu et al. | |
| 10,592,765 B2 | 3/2020 | Fathi et al. | |
| 10,643,093 B1 | 5/2020 | Bhattacharjee et al. | |
| 10,839,234 B2 | 11/2020 | Wang | |
| 10,846,817 B2 | 11/2020 | Kanzawa et al. | |

* cited by examiner

*Primary Examiner* — Christopher Wait
(74) *Attorney, Agent, or Firm* — Fish & Richardson P.C.

(57) ABSTRACT

Methods and systems for associating labels between multiple sensors. One of the methods includes generating user interface presentation data that, when presented on a user device, causes the user device to display a user interface that: displays the images in the sequence of images and data identifying the first and second object tracks, and is configured to receive user inputs that associate first object tracks with second object tracks; and providing the user interface presentation data for presentation on the user device.

20 Claims, 8 Drawing Sheets

ASSOCIATING LABELS BETWEEN MULTIPLE SENSORS

BACKGROUND

This specification generally relates to labeling sensor data captured by one or more sensors of an autonomous vehicle.

Autonomous vehicles include self-driving cars, boats, and aircraft. Autonomous vehicles use a variety of on-board sensors and computer systems, e.g., computer systems that make use of trained machine learning models, to detect nearby objects and use such detections to make control and navigation decisions. Labeling of training data used in these machine learning models plays an important role in ensuring the proper operation of these models.

DETAILED DESCRIPTION

Figure 1:
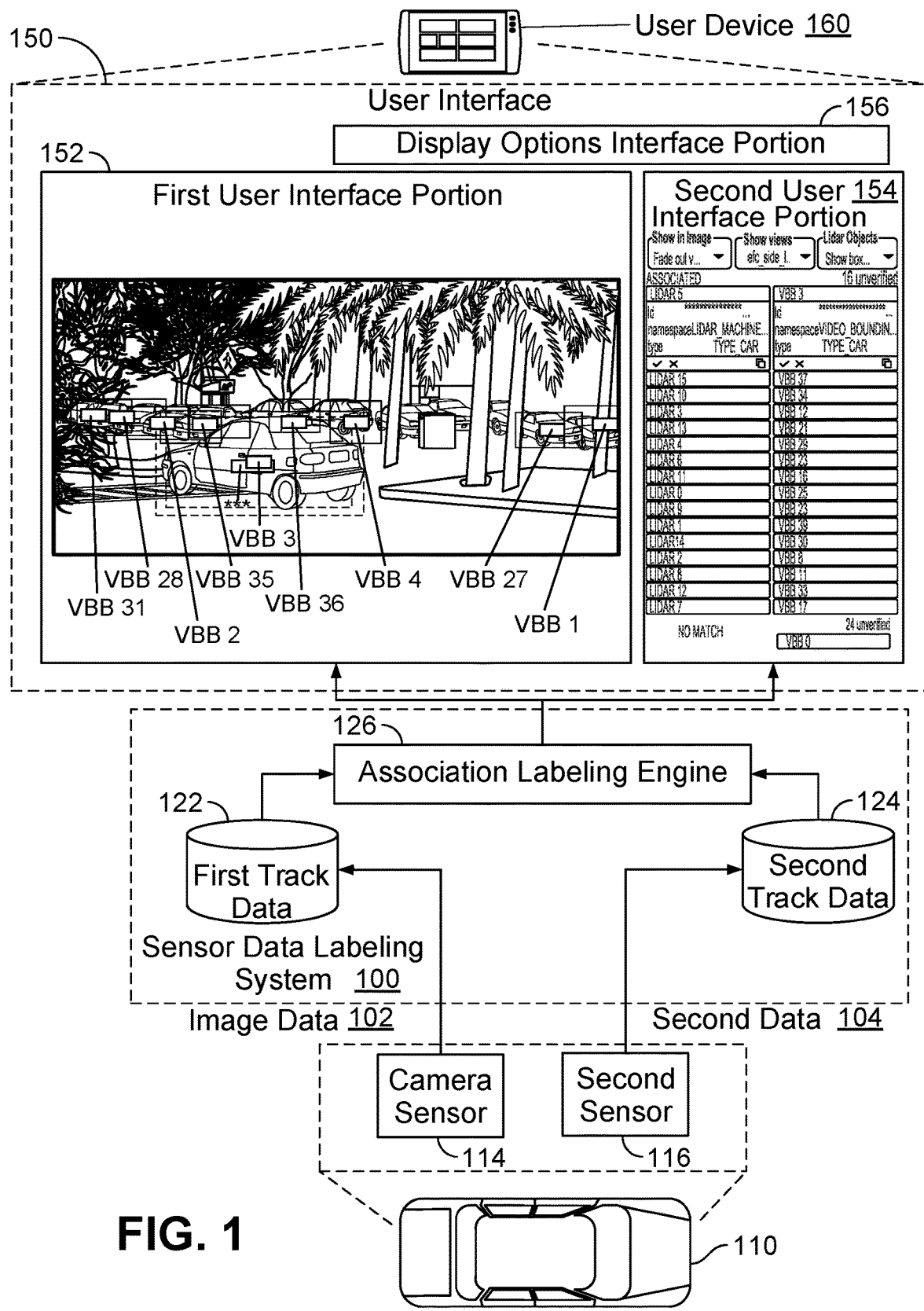
FIG. 1 shows an example sensor data labeling system.

This specification describes a system that receives as input two sequences of sensor measurements from two different sensors that are collected about the same scene in an environment, and generates labels that identify which portions of each of the sequences depict the same object. For example, the sensor data can be measurements of an environment generated by sensors of an autonomous vehicle as the vehicle navigates through the environment.

Conventional user interface technologies allow users to submit inputs to generate object tracks within sensor measurements captured by a single sensor. For example, some conventional user interface techniques allow users to submit inputs that draw bounding boxes around regions of images or point clouds that the users have identified as depicting objects. These conventional technologies then generate labels based on these regions and use these labels to train machine learning models, e.g., models that process sensor measurements and predict which portions of those sensor measurements depict some object.

In many instances, however, measurements from multiple sensors of the same scene are available. For example, an autonomous vehicle can have multiple sensors that each generate sensor measurements of the same scene during operation of the autonomous vehicle. As a particular example, an autonomous vehicle can have a lidar sensor that generates point clouds and a camera sensor that generates images. As another example, an autonomous vehicle can have two different camera sensors located at different positions on the autonomous vehicle.

While conventional user interface technologies can be used to generate accurate labels for measurements from a single one of these sensors, these technologies cannot be used to associate measurements from one sensor with measurements from another sensor (also referred to associating "labels" between the two sensors). That is, these user interface technologies do not have functionality that allows users to indicate which region of a sensor measurement from one sensor, e.g., a camera image captured by a camera, depicts the same object as a region in a sensor measurement from another sensor, e.g., a point cloud generated by a lidar sensor.

However, having data that reliably associates labels between two sensors can improve the performance of any of a variety of downstream tasks that are important to the operation of autonomous vehicles and that rely on such label associations.

For example, when one sensor is a camera sensor and the other sensor is a lidar sensor, associations between sensor measurements can be used to generate training data for training a machine learning model, e.g., a deep neural network, that predicts three-dimensional object properties from an image alone. Examples of three-dimensional object properties include the depth of an object, the velocity of the object, the size of the object, the direction that the object is facing. While models may be able to accurately predict such properties from images alone, because the image is two-dimensional, ground truth labels for these properties cannot be easily derived directly from an image. However, these properties can be easily determined from lidar sensor measurements that generate three-dimensional measurements of objects. If accurate associations between lidar sensor measurements and camera images are available, information from lidar sensor measurements, i.e., point clouds, can be used to generate training data for models that operate on images alone to predict three-dimensional object properties.

Many systems, e.g., systems on-board autonomous vehicles, attempt to detect objects in each sensor individually, and then later attempt to fuse together detections across sensors if they represent the same object, e.g., by using a machine learning model or heuristics to determine when two detections are the same object. If accurate associations between lidar sensor measurements and camera images are available, the information from lidar sensor measurements can provide ground truth object associations for training or evaluating such fusion systems.

As another example, different sensors can perform better or worse in different circumstances. For example, radar can be more resilient to fog than laser is, cameras can have higher range than laser does, and radar can sometimes "see" through partial occluders like trees that would block laser and camera sensors. If accurate associations between different sensor measurements are available, these associations can provide information about circumstances in which one sensor performs better than the other. In particular, if there are sensor measurements from one sensor that do not have a labeled detection of the same object that is detected in a corresponding sensor measurement from another sensor, this provides information that the other sensor may perform better in the circumstances during which the two sensor measurements were captured.

This specification describes user interface technologies that generate accurate associations between labels from different sensors. In particular, this specification describes user interfaces that, unlike conventional techniques, present camera images and, within the camera images, data identifying object tracks from multiple different sensors. By presenting the sensor data in this manner, a user can be presented with information that allows the user to accurately identify which object track from one sensor, e.g., a lidar sensor, corresponds to the same object as a given object track from another sensor, e.g., the camera sensor that captured the camera images. Moreover, the described user interface technologies can, in some implementations, display additional information that can result in improved associations. For example, in some implementations, the user interface can also display top-down representations of scenes along with camera images, can also display distances from sensor measurements to the sensor that captured the sensor measurements, or otherwise can display information that distinguishes one object track from another in crowded scenes that include many objects.

Once the associations have been generated, they can be used to improve the performance of any of a variety of downstream tasks, e.g., one or more of the downstream tasks described above.

FIG. 1 shows an example sensor data labeling system 100. The sensor data labeling system 100 is an example of a system implemented as computer programs on one or more computers in one or more locations, in which the systems, components, and techniques described below can be implemented.

Generally, the sensor data labeling system 100 receives as input at least two streams of sensor data collected about a scene in an environment and allows users to determine which portions of each of the streams depict the same object. An environment is a region of the real world that can be measured by sensors, e.g., a region in the real world that is in the vicinity of a roadway and can therefore be measured by sensors of vehicles driving along the roadway. For example, the sensor data can be measurements of an environment generated by different sensors of an autonomous vehicle as the vehicle navigates through the environment.

More specifically, the system 100 receives a sequence 102 of images of a scene in an environment captured by a camera sensor 114, e.g., a camera sensor of an autonomous vehicle 110 or a different agent in the environment.

Once the sequence 102 of images has been obtained, the system 100 generates first object track data 122 that specifies a respective first object track for each of one or more first objects.

The first object track for any given first object identifies respective positions of the first object in one or more of the images in the sequence 102. For example, the first object track data 122 can identify, for each first object that has been detected in any of the sequence of images 102, a respective bounding box in each of the images in which the first object was detected. That is, the first object track for a given one of the first objects is a respective bounding box in each of the images in which the first object was detected. The respective bounding box in each of the images encloses the portion of the image that depicts the first object.

In some implementations, the system 100 or another system receives, from one or more users, inputs that define the first object track data 122. For example, users can submit inputs that identify, for each of multiple objects depicted in the sequence of images, the position of the object in one or more of the images in the sequence 102. In another example, the system 100 or the other system can first apply an appropriately trained object detector to each image in the sequence and a user can submit inputs indicating which of the bounding boxes output by the object detector represent the same object, i.e., which bounding boxes should be grouped together into the same object track.

In some other implementations, the system 100 analyzes the sequence of images to detect objects that are depicted in the sequence of input images. In these implementations, the system 100 can generate the first object track data 122 using any appropriate object tracking technique. In some embodiments, the object tracking technique includes applying an appropriately trained object detector to each image in the sequence and then applying either an ML-based or a rule-based object tracker to the object detections.

The system 100 also receives a second sequence 104 of sensor measurements from a second sensor 116 that is different from the camera sensor 114.

The sequence 104 of sensor measurements obtained from the second sensor identify the same scene in the environment, i.e., the same real-world region at the same time, identified by the sequence 102 of images of the scene.

Generally, the second sensor 116 is another sensor of the autonomous vehicle 110 or other agent in the environment.

As one example, the second sensor 116 can be a lidar sensor that detects reflections of laser light and the second sensor measurements can be point clouds generated by the lidar sensor. A point cloud is a collection of points, with each point having a position in a particular coordinate space and each point representing a reflection of laser light. Optionally, the point cloud can also include other information for each point, e.g., an intensity, a second return, an elongation, and so on.

As another example, the second sensor 116 can be a different camera of the autonomous vehicle or other agent, e.g., a camera located at a different position on the vehicle or agent from the camera that generated the sequence 102, and the second sensor measurements are also images.

As yet another example, the second sensor 116 can be a sensor, e.g., a camera sensor or a lidar sensor, of another autonomous vehicle that also captured sensor measurements of the same scene in the environment from a different perspective.

Once the system 100 obtains the sequence of sensor measurements 104 from the second sensor, the system 100 generates initial second object track data that specifies a respective initial second object track for each of one or more second objects. The respective initial second object track for a second object identifies respective positions of the second object in one or more of the sensor measurements. As a particular example, when the sensor measurements are images, the initial second object track data can specify, for each detected second object, a respective two-dimensional bounding box in each image in which the object has been detected. When the sensor measurements are point clouds, the initial second object track data can specify, for each detected second object, a respective three-dimensional bounding box or contour in each point cloud in which the object has been detected.

The system 100 can generate the initial second object track data as described above, e.g., based on labels received from users or using an appropriate object tracking technique.

In some implementations, as part of generating the first object track data, the initial second object track data, or both, the system 100 can augment a given object track with additional detections, i.e., identify additional positions of the corresponding object. For example, if a given object track does not include a detection of the corresponding object in a particular sensor measurement but does include detections of the object in a preceding sensor measurement that precedes the particular sensor measurement and a subsequent measurement that follows the particular sensor measurement, the system 100 can interpolate between the positions of the object in the preceding and subsequent measurement to generate an interpolated position for the object in the given sensor measurement. The system 100 can then include the interpolated position for the object in the corresponding object track.

Once the system 100 has generated the initial second object track data, the system 100 uses the correspondence between the sequence of images and the sequence of sensor measurements to generate final second object track data 124 that projects the initial second object track data into the sequence of images. That is, while the initial second object tracks identify respective positions of each second object in one or more of the sensor measurements, the final second object tracks in the final second object track data 124 identify, for each second object, respective positions of the second object in one or more of the images in the sequence of images.

To generate the final second object track for a given second object, for each sensor measurement that depicts the second object, the system 100 projects the identified position of the second object from the sensor measurement and into the image that was taken at the same time as the sensor measurement that depicts the second object, e.g., using calibration data between the camera sensor and the second sensor. For example, the system 100 can project a three-dimensional bounding box in the coordinate system of a point cloud to a two-dimensional bounding box in the coordinate system of an image that was captured at the same time as the point cloud using calibration data that maps three-dimensional points in the point cloud coordinate system to two-dimensional points in the image coordinate system. The calibration data can be generated based on, e.g., a calibration between the camera that captures the images and the lidar sensor that captures the point clouds.

As a particular example, the system 100 can maintain calibration data for the camera sensor 114 and calibration data for the second sensor 116. The calibration data for the second sensor 116 maps points in the coordinate system of the second sensor 116 to coordinates in a shared coordinate system, e.g., coordinates in a vehicle coordinate system that is centered at the vehicle if both sensors are on the same vehicle or coordinates in a vehicle coordinate system that is centered at the vehicle on which the camera sensor 114 is deployed if the two sensors are on different vehicles. The calibration data for the camera sensor 114 maps points in the shared coordinate system to points in an image coordinate system, i.e., the two-dimensional coordinate system within images captured by the camera sensor 114. By using this calibration data, the system 100 can map points in sensor measurements generated by the second sensor 116 from the coordinate system of the second sensor 116 to the shared coordinate system and then to the image coordinate system of the camera sensor 114.

An association labeling engine 126 within the system 100 then uses the image sequence 102 and the first and second object track data 122 and 124 to provide presentation data to a user device 160 to cause the user device 160 to present a user interface 150. The user interface 150 presents the images in the sequence of images and data identifying the first and second object tracks and allows a user to associate first objects with corresponding second objects, i.e., that allows the user to identify which second object is the same object as any given first object by associating a label, i.e., identifier, for the first object track for the first object with the label for a second object track for another object.

The presentation data can be in any appropriate format that causes the user device 160 to present the user interface 150, to modify the presentation of the user interface 150 in response to user inputs, and to transmit data to the system 100 as described below. For example, the presentation data can be encoded as Javascript commands that can be executed by a user device to render the user interface. Alternatively, the presentation data can be in an XML-based markup language such as XUL, or can be SVG (Scalable Vector Graphics) data. User interface presentation data can also include combinations of formats, such as Javascript supplemented with XML.

The user device 160 can be any computing device capable of displaying a graphical user interface (GUI), including a mobile device, a laptop, or a desktop computer. The user device 160 provides the user with an ability to provide input through the user interface 150 to be transmitted to the system 100, e.g., by submitting touch inputs through a touch screen or a mouse click or other selection using an input device.

Generally, the user interface 150 includes a first user interface portion 152 that at, any given time, displays an image from the sequence of images. The first user interface portion 152 can also identify the respective positions in the displayed image of (i) any of the one or more first objects that are identified as being depicted in the image by the first object track data and (ii) any of the one or more second objects that are identified as being depicted in the image by the second object track data.

Generally, the position of a given object in a given image is identified in the first portion 152 by an identification feature that is displayed in the given image while the image is displayed in the first portion 152. The manner in which the user interface 152 identifies the positions of objects in images, i.e., the identification feature used to identify the position of the object, can be the same for measurements from the two sensors, or it can be different between the two sensors.

In some implementations, when a bounding box is used to identify objects in camera data, the identification features for first object tracks can be bounding boxes that are presented as solid line boxes or dashed line boxes. In some implementations, the solid line boxes can identify the location of objects that have been positively verified by a user, i.e., as being associated with another label, whereas dashed line boxes may not have been positively verified by a user.

In some implementations, when the second sensor is a lidar sensor, the projected point clouds for the second object tracks can also be presented as bounding boxes, although a bounding box of a different color or presentation style than that used for first object tracks can be used to identify the location of objects from second object tracks.

In other implementations, when the second sensor is a lidar sensor, the second object tracks can be identified using object contours. In an object contour, a general outline of an identified object is presented. The contour includes a grid-like pattern within the boundaries established by the outline. Each point in the contour can be based on a data point in the point cloud, each point having an associated distance from the lidar sensor to the point.

The user interface 150 also includes a second user interface portion 154 that displays data identifying the first and second object tracks, i.e., displays labels for the first and second object track, and allows the user to submit inputs to associate a first object track with a second object track.

In some cases, the user interface also includes a display options interface portion 156 that can provide a user with filtering options for viewing object track data in the first portion 152 or the second portion 154.

While not shown in FIG. 1, the user interface 150 generally also includes a third user interface portion that allows the user to navigate through the images in the image sequence, i.e., to change which image is displayed in the first user interface portion. For example, the third user interface portion can be a "timeline" portion that allows the user to select a time in order to view the image that was captured at that time. In some cases, the third user interface portion can include a "playbar" user interface element that a user can select to cause the user interface portion to scroll through all of the images in the sequence in the order in which they were captured.

The portions of the user interface 150 will be described in more detail below.

In some implementations, prior to providing the presentation data to the user device 160, the association labeling engine 126 can generate candidate associations between two or more object tracks that are candidates for corresponding to the same object. In particular, the association labeling engine 126 can analyze the first and second object track data and assign a measure of similarity to each pair of first and second object tracks. The association labeling engine 126 can then use these measures of similarity to identify certain object tracks as being candidates for depicting the same object. In these implementations, the system 100 can display, in the second portion 154, data identifying the candidate associations. In some of these implementations, the system 100 can require that the user confirm each candidate association in the second portion 154 prior to "finalizing" the association while, in others of these implementations, if the user does not modify a candidate association during a given labeling session, the system 100 determines that the candidate association should be "finalized."

As one particular example, for each possible pairing of (first object track x, second object track y) and for each image, the engine 126 can compute the intersection-over-union (IOU) between x's bounding box and y's bounding box. The engine 126 can then compute the average across each image in which both x and y have a bounding box as the similarity measure between the first object track x and the second object track y.

In this example, to use the similarity measures to identify candidate associations, the engine 126 can define a cost of associating x and y based on the similarity measure, e.g., equal to 1 minus the similarity measure. Thus, the cost will be low if x and y are very similar, and high otherwise. The engine 126 can then search for the set of associations that minimizes the total cost of all associations, with the constraint that (i) if x and y are associated, the engine 126 cannot also associate x to any other second object and, in some cases, (ii) that each first object track must be associated with exactly one second object track. The engine 126 can solve for this set of associations using any appropriate conventional technique for solving the assignment problem.

Once the system 100 receives, through the user interface, an input associating two object tracks, e.g., either generating a new association or confirming a candidate association generated by the system, the system 100 can store data associating the two object tracks as being measurements of the same object, e.g., in a repository or other data storage accessible by the system. The system 100 can then use the stored data for one or more downstream tasks, e.g., one of the downstream tasks described above.

Figure 2:
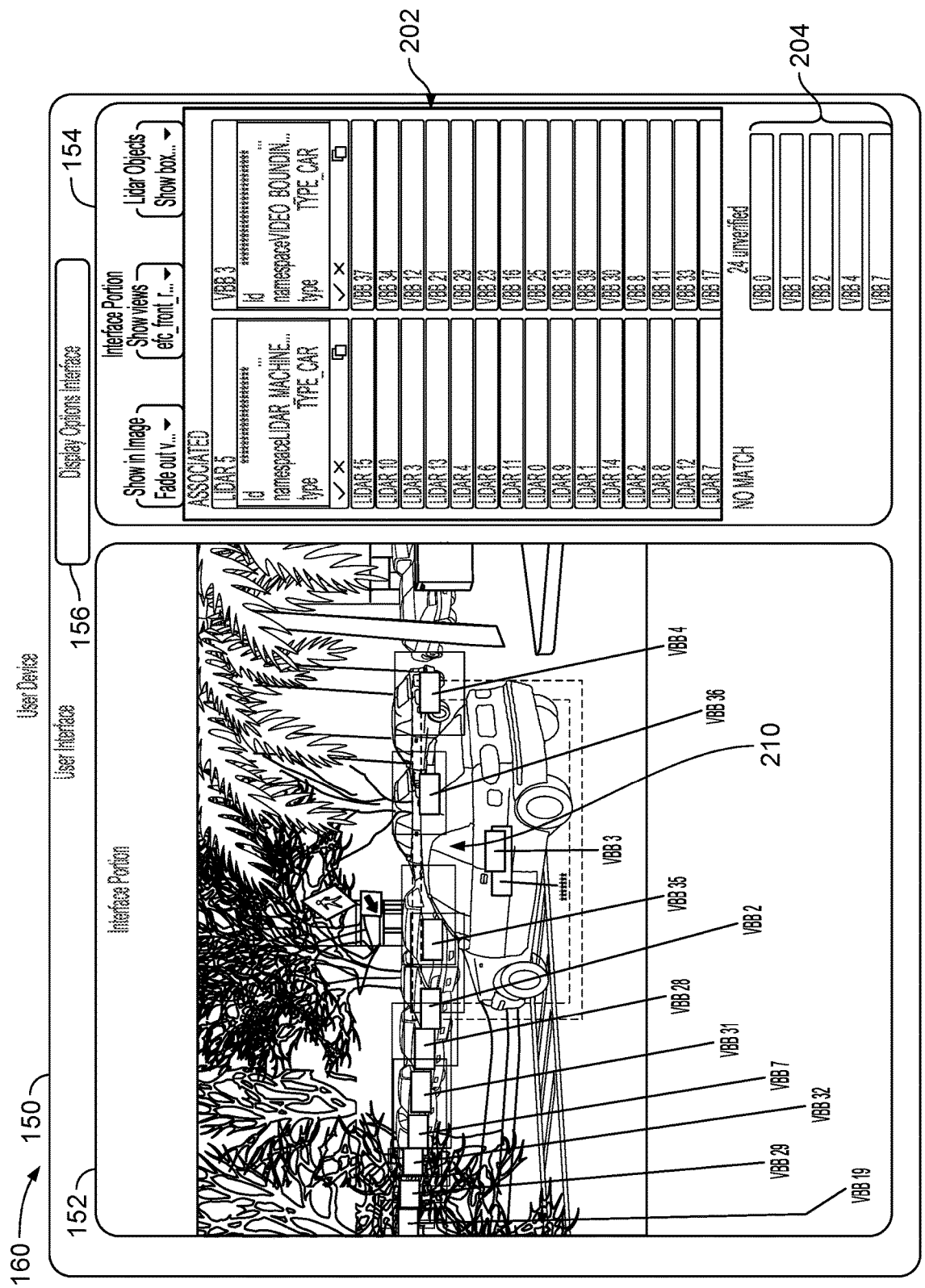
FIG. 2 is an example view of a user interface presented on a user device.

FIG. 2 is an example detailed view of the user interface 150 presented on the user device 160.

As shown in FIG. 2, identified objects present in object track data and displayed in the first user interface portion 152, e.g., an object 210, in any given image can include objects that are present at a distance from the sensor, objects that are partially occluded from the sensor by other objects, and so on.

Identified objects can be identified using overlapping bounding boxes or contours, as shown in FIG. 2. In some implementations, when the second sensor is a lidar sensor and the distance of a given point from the sensor is available from the sensor measurement, the distance from the sensor to a given object can be displayed as a popup to the user in the user interface portion 152, e.g., in response to a user input selecting a contour or a bounding box corresponding to a second object. When objects are partially occluded, viewing the distance can assist a user in determining which object a given bounding box or contour corresponds to.

As shown in FIG. 2, the second portion 154 displays labels, i.e., names or other identifiers, for first and second object tracks. The labels for first and second object tracks can be shown as a list, as in FIG. 2. Additionally, object track labels for first and second object tracks that are currently associated with each other, i.e., are candidates for depicting the same object, can be displayed with an indication as an associated list 202 in the second portion 154. As shown in FIG. 2, the associated list 202 displays the labels corresponding to the first object tracks in alignment with the labels corresponding to the second object tracks, with the labels for two object tracks being horizontally aligned indicating that the two object tracks are currently associated, i.e., either because of a previous user input or because the two object tracks were identified as candidates by the engine 126.

The second portion 154 also displays an unassociated list 204 that includes labels for object tracks from one of the sensors without an associated object track label from the other sensor, i.e., labels for object tracks that are not currently associated with any other object track.

A user can submit inputs, e.g., touch inputs or inputs with an input device, to the second portion 154 to modify the current associations identified in the second portion 154. For example, a user can remove a current association by dragging one of the displayed labels so that it is no longer horizontally aligned with the other displayed label. As another example, a user can generate a new association by moving a label that is currently unassociated or associated with a different label so that the label is horizontally aligned with another label.

As another example, a user can submit one input, e.g., a touch input or a mouse click, identifying a displayed label and second input identifying another label for an object track from a different sensor to form an association between the two object tracks.

In some implementations, the object track data associated with a label can become highlighted upon being selected by a user. The user can then create an association with a second labeled object track by submitting an input to select a correct label in the second labeled track data list corresponding to the same object.

Once an association has been created, modified or confirmed, the associated object tracks in the first portion 152 can then be modified to identify that they have been associated, e.g., to be displayed in a translucent view. That is, the first portion 152 can display object tracks differently depending on whether the tracks are currently associated or not. In some implementations, darkened colors provide a visual indication to the user that an association between the labels of track data between the first and second sensors is present.

In some implementations, in order to assist with effectively identifying associations, the user interface 150 can display additional information in response to certain user inputs.

To this end, the display options interface 156 can be included in the user interface 150, and can provide a user with filtering options for viewing object track data in the first portion 152 or the second portion 154. The display options interface 156 can include options to filter object tracks by a particular attribute, by association, or to select object track data to hide while keeping other object track data visible. In some implementations, a user can select to hide track data associated with either the first or the second sensor. In some implementations, a user can select to hide particular tracks. In some implementations, the user can change display options, such as color, style, font, or other display items associated with label display, bounding box display, or contour display.

In some implementations, when the user has filtered to view a proper subset of the object tracks, e.g., has selected one first object track and one second object track for review to determine whether two object tracks should be associated, the respective length of the selected object tracks are visualized along the timeline in the third user interface portion as a temporal clue to the potential association. That is, the third user interface portion can display, for each selected object track, a visual indicator of the time span between the first image in which there is a detection of the corresponding object and the last image in which there is a detection of the corresponding object. The visual indicator can be, e.g., a horizontal line along the timeline in the third user interface portion that runs from the time between the first image and the last image.

As a particular example, when the second sensor is a lidar sensor, to assist the user in identifying accurate associations, the user can submit an input through the display options interface 156 or through another user interface element in the user interface 150 to cause the user interface to show a top-down view of the scene in the first portion 152 in addition to or instead of a camera image. The top-down view of the scene leverages the depth, i.e., distance, information that is available through the lidar sensor measurements to provide the user additional information about the scene at the corresponding time point.

Figure 3A:
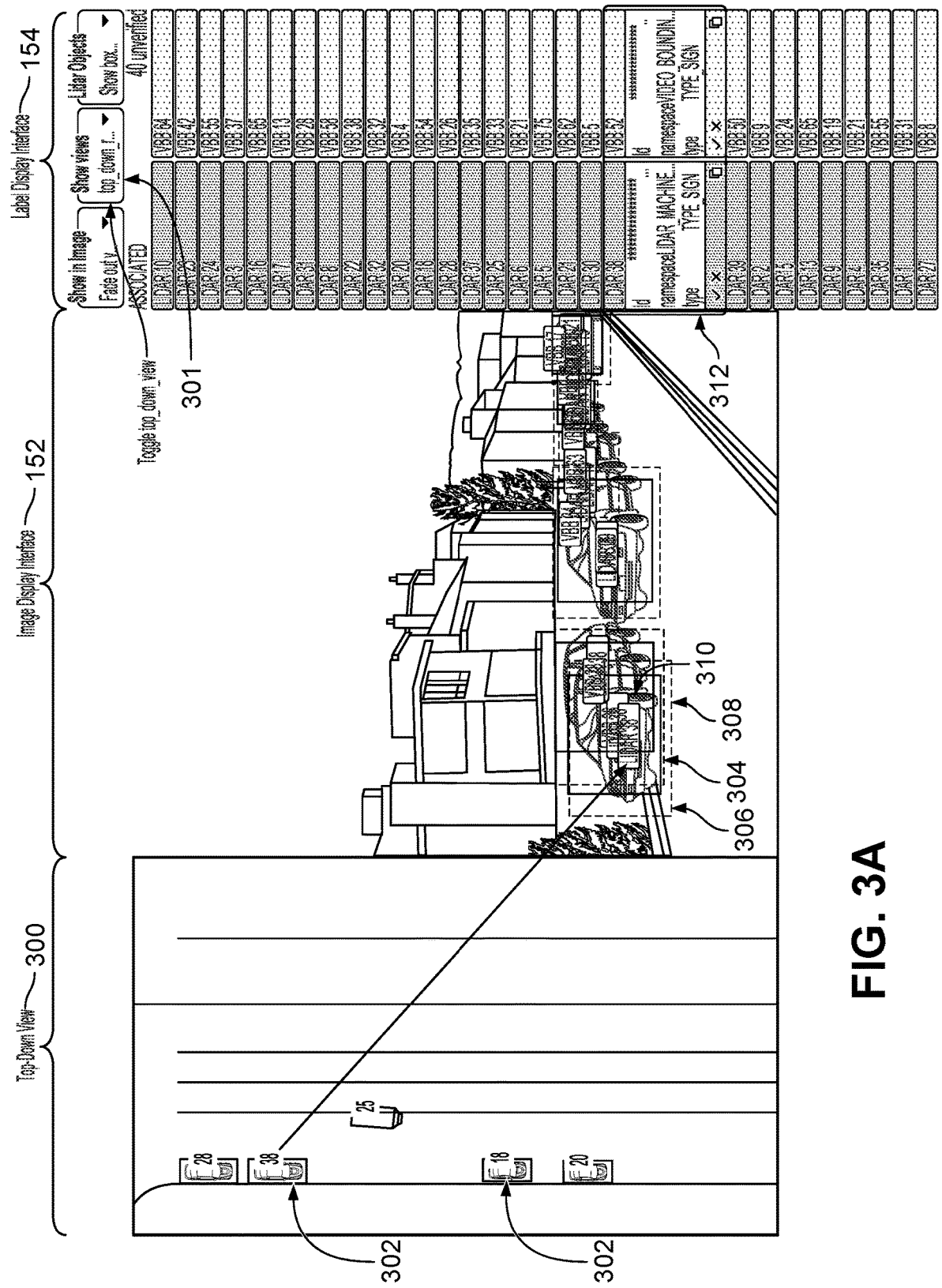
FIGS. 3A-3C are examples of a top-down view of lidar sensor data shown in the user interface.
Figure 3B:
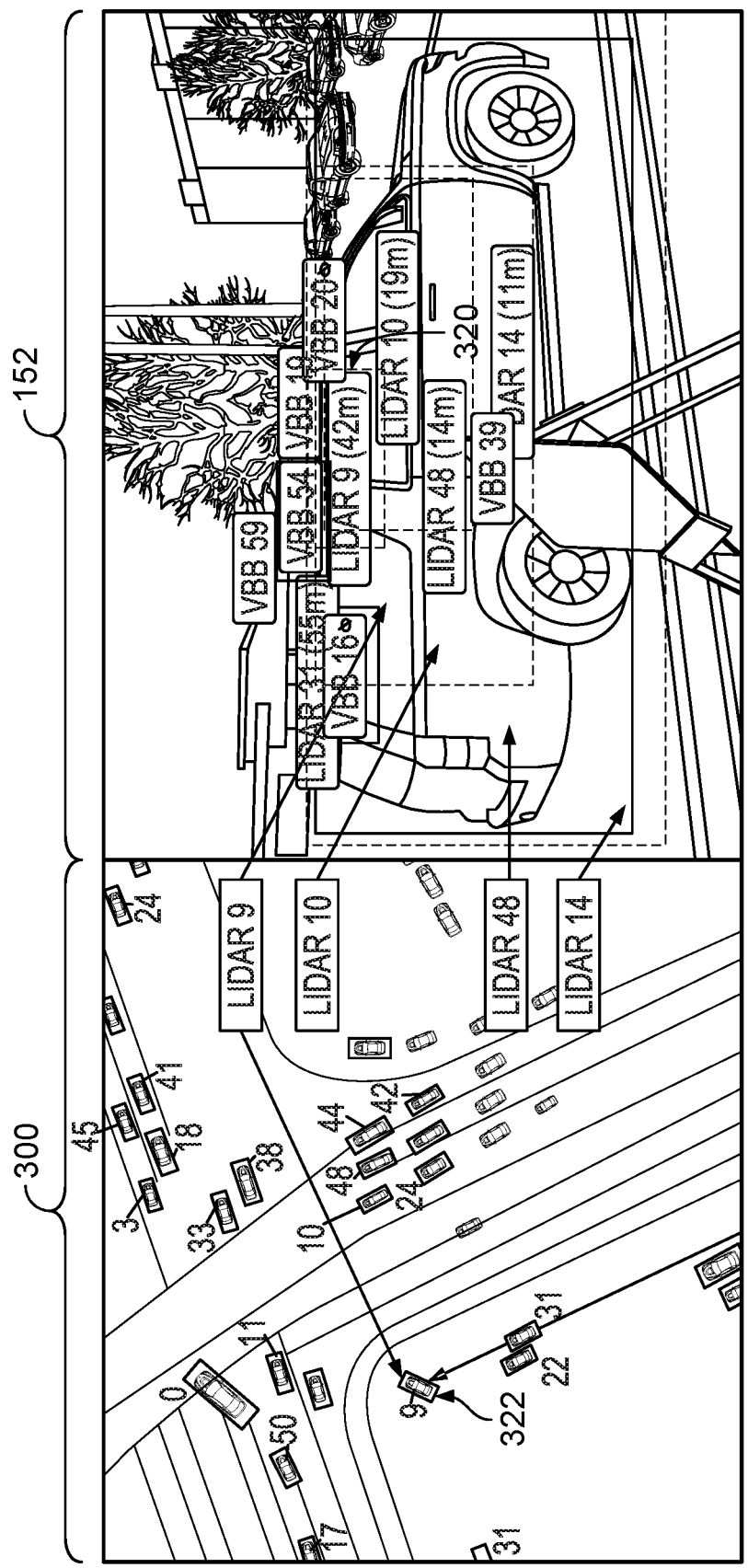

FIGS. 3A and 3B are examples of a top-down view of lidar sensor data being shown in the user interface 150.

As described above, the user interface 150 can be configured to show a top-down view 300 in response to a user input selecting a user interface element, shown in FIGS. 3A and 3B as a toggle option 301.

The top-down view 300 can be generated from the data available in the 3D point clouds from lidar sensors.

The top-down view 300, as shown in FIG. 3A, is shown as a roadway environment, with lanes running vertically in the top-down view 300. The view is shown alongside the image display interface 152 and the label display interface 154, such that a user can view associated corresponding objects with associated labels across each of the interface portions. The view 300 identifies a plurality of object tracks 302 that depict the location of objects on the roadway. The view 300 depicts the location of the objects based on the information in the point cloud data collected by the lidar sensor. As shown, the positions of the corresponding object track varies based on relative position from the sensor. A representative box or other identifying feature can be drawn to depict the presence of the object track.

The associated image display interface 152 is shown positioned alongside the top-down view 300. The object tracks 302 identified in the top-down view can be shown in the image display interface 152 corresponding to the same object 304.

In some implementations, by way of example, item "38" is shown as corresponding to an object track in the top-down view. Referring to the image display interface 152, a dashed box 306, associated with label "LIDAR 38" is displayed.

The object associated with the dashed box 306 is a parked vehicle on the side of the road. A second object track 308, associated with "VBB 52" is associated with the same vehicle 304. As can be seen, the first object track 306 and the second object track 308 appear to be associated with the same vehicle. In such an implementation, the identification features are represented as a blue dashed box 306 for the lidar track, and as a yellow dashed box 304 for the camera track. The point cloud data, as collected by the lidar sensor, shows the contour 310 of the vehicle identified by the associated labels "LIDAR 38" and "VBB 52." The label display interface 154 shows the labels "LIDAR 38" and "VBB 52" displayed in an aligned position 312, thus representing the association of the corresponding object tracks.

FIG. 3B shows an alternative view of a top-down side-by-side lidar-camera display. In the implementation of FIG. 3B, the user can observe the locations of identification features 320 of occluded objects 322 that would not otherwise be visible in the interface portion 152. As shown, the object 322 identified in the top-down view 300 on the left of the user interface system 150 corresponds to a label "LIDAR 9". In this specific example, the identified object can correspond to a vehicle. In the image display 152 on the right, the object 322 is completely occluded by the grey vehicle. The identification feature 320 corresponds to track label "LIDAR 9" and is shown as a blue dashed box surrounding the occluded vehicle.

In particular, an object that is completely occluded to one sensor at a given time may not be occluded to another sensor at that same time, i.e., because the sensors are positioned differently and therefore have different viewpoints.

Moreover, as described above, in some implementations, the system includes interpolated positions in object tracks. These interpolated positions from second object tracks can be visible in a top-down view even when the corresponding object is completely occluded to the camera sensor at the given time point.

Thus, a user can use the top-down view 300 to distinguish between second object tracks that may not be visually distinguishable in the image shown in the portion 152.

Additionally, at some time points, the scene being depicted in a given image includes a large number of objects, many of which are heavily occluded by other objects. When viewed from the perspective view camera image, the bounding boxes from the second object tracks are difficult to distinguish from one another. When viewed in the top-down view, however, the same boxes are more spread out, and a user can more readily determine which second object track is the same as which first object track at the corresponding time point.

Figure 3C:
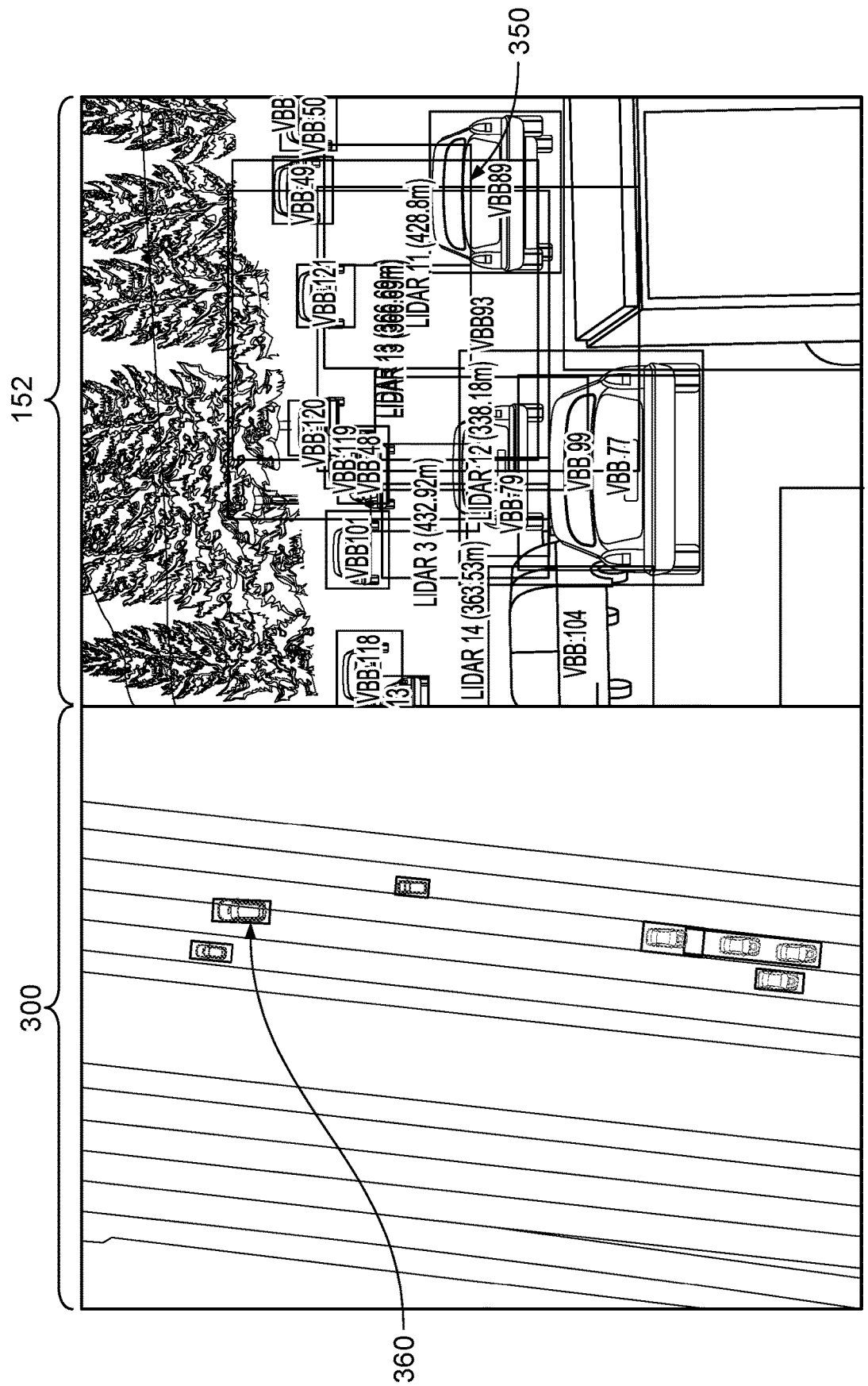

FIG. 3C is another example of the top-down view 300 shown alongside the first user interface portion 152. More specifically, FIG. 3C shows an example of a scene with many occluded objects viewed both from the top-down view and from the perspective view. As can be seen in FIG. 3C, there are many bounding boxes from the second object tracks that are difficult to distinguish from one another in the perspective view. For example, it is difficult to determine which object a bounding box 350 for a second object track "LIDAR 11" refers to because it appears to be in the same region as other bounding boxes for other second object tracks. However, in the top-down view 300, a bounding box 360 for the same "LIDAR 11" object track is separated from all of the other bounding boxes for the other second object tracks due to the incorporation of the distances that are available from the laser measurements.

In some implementations, the display options interface 156 or another portion of the user interface 150 can include one or more controls that allow a user to modify how some of the object tracks are identified in the user interface portion 152. For example, the user can select a control to modify the identification feature that is used to identify one or more of the object tracks, e.g., so that a contour is shown in addition to or instead of a bounding box.

Figure 4A:
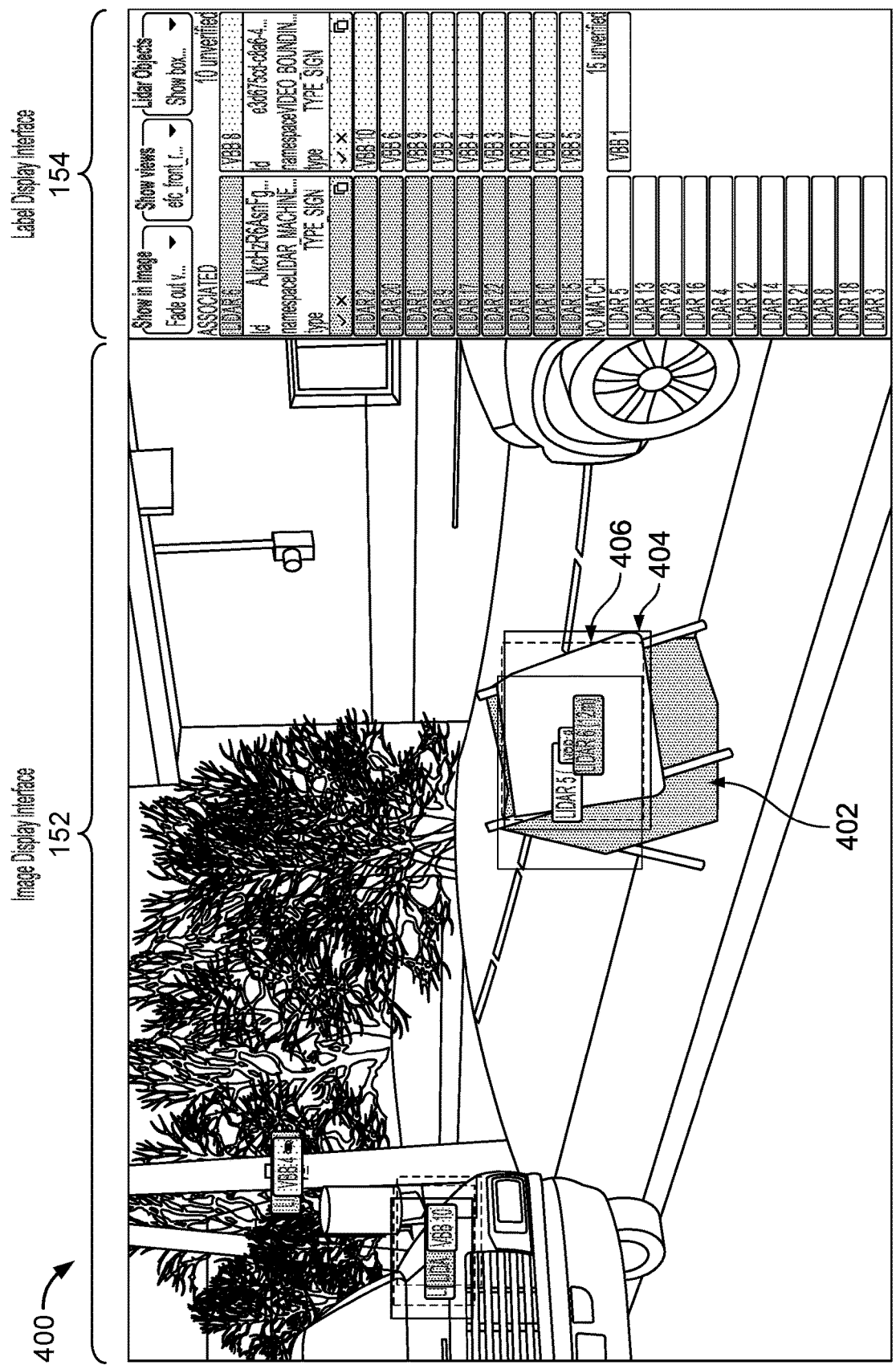
FIGS. 4A and 4B are examples of a contour view of a sign shown in the user interface.
Figure 4B:
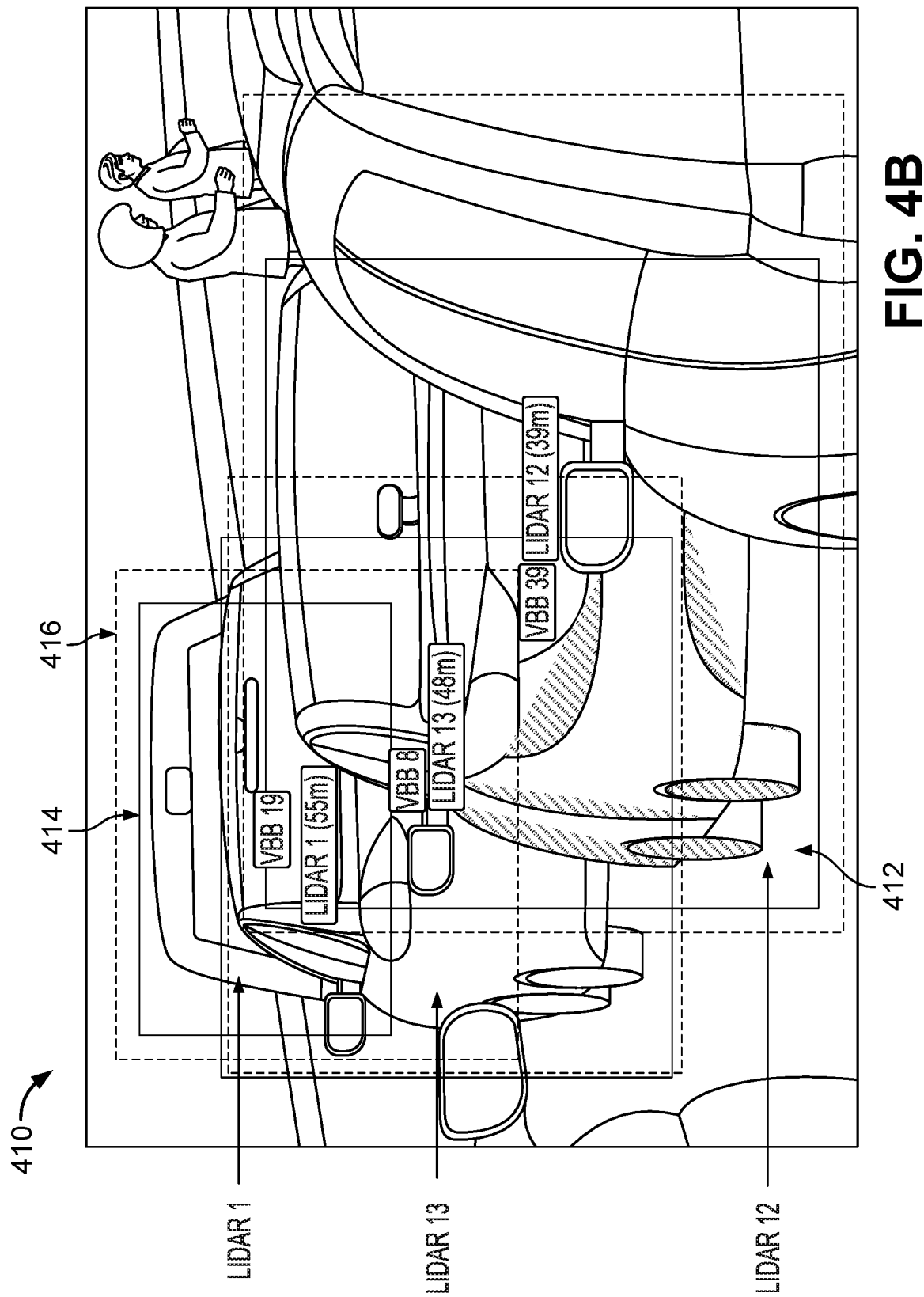

FIGS. 4A and 4B show images that illustrate a contour being used as an identification feature for an object track.

As shown in FIG. 4A, the first and second object tracks have been identified from measurements by a camera and a lidar sensor, respectively. An object track 404 of the lidar sensor is shown as a dashed blue box and an object track 406 of the camera sensor is shown as a dashed yellow box. The object identified appears to be a "No Parking" sign, which is identified by a contour identification feature 402. The contour 402 is superimposed within the first user interface portion 152 on the corresponding object based on information in the point cloud data available from the lidar system.

FIG. 4B shows an alternative example of the contour feature for identification of object track data, in which lidar object tracks corresponding to a plurality of identified vehicles in a row of traffic are occluded by other vehicles. In the implementation of FIG. 4B, at least three vehicles have been identified by the lidar sensor and the camera sensor, as verified by a blue bounding box 416 and a yellow bounding box 414, respectively. From the viewpoint of the camera as shown in FIG. 4B, the two farthest forward vehicles in the image are largely occluded by the rearmost vehicle. As shown, a contour 412 associated with each identified vehicle can be overlapped on the corresponding object track to identify the associated object. Viewing the contours 402 and 412 can assist a user in distinguishing between object tracks that would be difficult to distinguish between if viewed using only bounding boxes.

Figure 5:
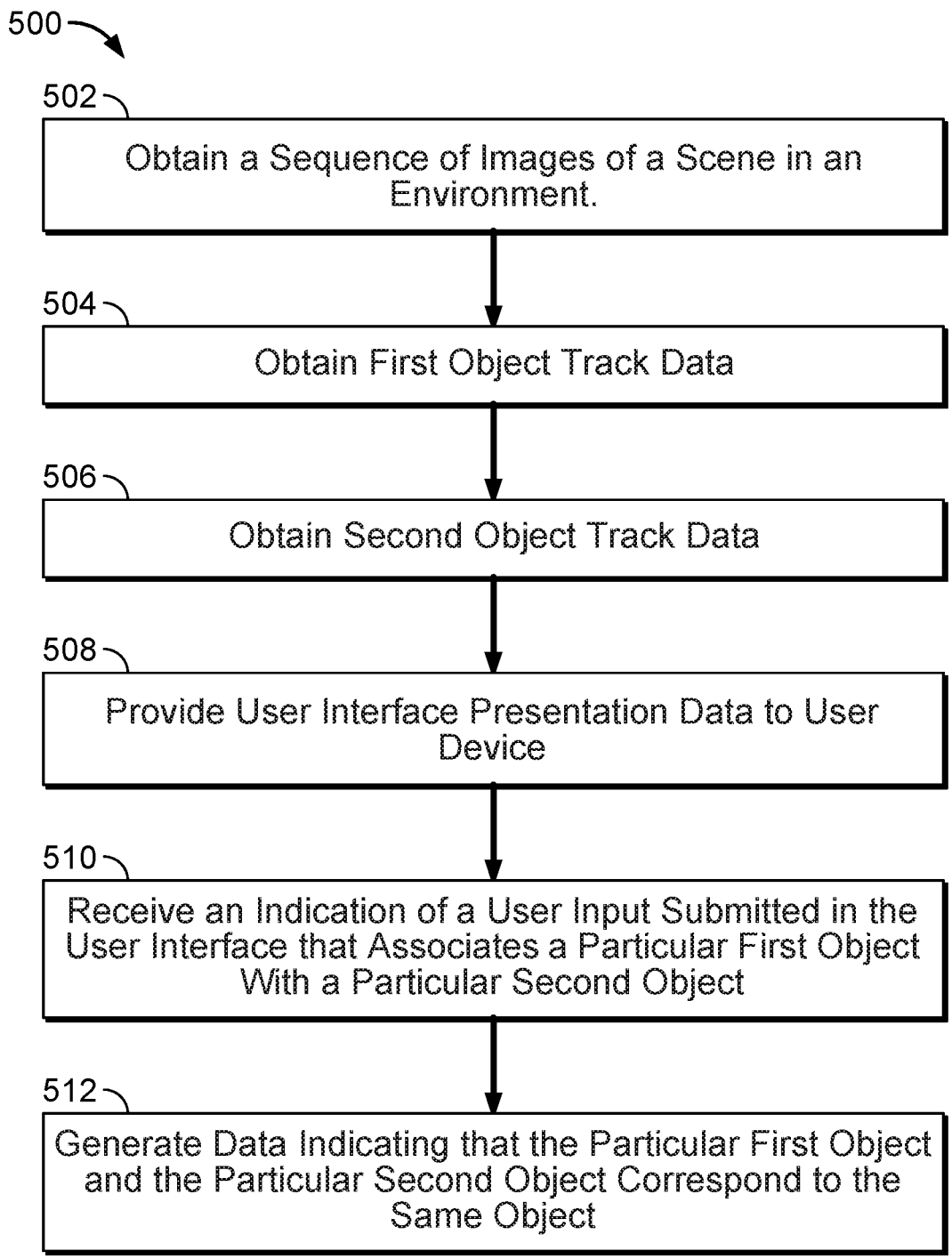
FIG. 5 is a flow diagram of an example process for associating object tracks from different sensors.

FIG. 5 is a flow diagram of an example process 500 for associating object tracks from two different sensors. For convenience, the process 500 will be described as being performed by a system of one or more computers located in one or more locations. For example, a sensor data labeling system, e.g., the sensor data labeling system 100 of FIG. 1, appropriately programmed, can perform the process 500

The system obtains a sequence of images of a scene in an environment (step 502).

The system obtains first object track data that specifies one or more first object tracks (step 504). Each first object track corresponds to a respective first object and identifies respective positions of the respective first object in one or more of the images. As described above, the first object track data has been generated by labeling sensor measurements generated by a first sensor, e.g., by the camera that captured the sequence of images.

The system obtains second object track data that specifies one or more second object tracks (step 506). Each second object track corresponds to a respective second object and identifies respective positions of the respective second object in one or more of the images. As described above, the second object track data has been generated by labeling sensor measurements generated by a second, different sensor. In particular, the second object track data has been generated by projecting initial second object track data generated as a result of the labeling into the coordinate system of the sequence of images.

The system generates user interface presentation data that, when presented on a user device, causes the user device to display a user interface.

The user interface generally includes a first user interface portion that, for each image in the sequence, displays the image and identifies the respective positions in the image of (i) any of the one or more first objects that are identified as being depicted in the image by the first object track data and (ii) any of the one or more second objects that are identified as being depicted in the image by the second object track data; and The user interface also includes a second user interface portion that allows a user to submit inputs associating first object tracks and second object tracks.

The system provides the user interface presentation data to the user device (step 508).

After providing the presentation data, the system receives an indication of a user input submitted in the user interface that associates a particular first object track with a particular second object track (step 510) and in response, generates association labeling data indicating that the particular first object track and the particular second object track correspond to the same object (step 512).

The system can then store this association labeling data and use the data for a downstream task. Examples of downstream tasks include training a machine learning model that predicts 3D properties of objects from images, training or evaluating a fusion system that fuses detections from the two sensors when the detections are of the same object, and evaluating which sensor operates better in various circumstances.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   obtaining a sequence of images of a scene in an environment;
   obtaining first object track data that specifies one or more first object tracks in the sequence of images that each correspond to a different first object and that have been generated by labeling sensor measurements generated by a first sensor;
   obtaining second object track data that specifies one or more second object tracks in the sequence of images that each correspond to a different second object and that have been generated by labeling sensor measurements generated by a second sensor that is different from the first sensor;
   generating user interface presentation data that, when presented on a user device, causes the user device to display a user interface that:
      displays the images in the sequence of images and data identifying the first and second object tracks, and
      is configured to receive user inputs that associate first object tracks with second object tracks; and
   providing the user interface presentation data for presentation on the user device.

2. The method of claim 1, further comprising:
   receiving an indication of a user input submitted in the user interface that associates a particular first object track with a particular second object track; and
   in response, generating data indicating that a particular first object corresponding to the particular first object track and a particular second object corresponding the particular second object track are a same object.

3. The method of claim 1, wherein:
   each first object track identifies respective positions of the corresponding first object in one or more of the images, and
   each second object track identifies respective positions of the corresponding second object in one or more of the images.

4. The method of claim 3, wherein the user interface includes:
   a first user interface portion that, when an image in the sequence is selected for presentation by the user, displays the selected image and identifies the respective positions in the image of (i) any of the one or more first objects that are identified as being depicted in the selected image by the first object track data and (ii) any of the one or more second objects that are identified as being depicted in the selected image by the second object track data; and
   a second user interface portion that is configured to receive the user inputs associating first object tracks and second object tracks.

5. The method of claim 1, wherein the first sensor is a camera that captured the sequence of images.

6. The method performed of claim 5, wherein the second sensor is a lidar sensor and the sensor measurements generated using the second sensor are point clouds.

7. The method of claim 5, wherein the second sensor is a camera different from the camera that captured the sequence of images.

8. The method of claim 4, wherein the second user interface portion presents data identifying labels associated with the first object tracks and the second object tracks.

9. The method of claim 8, wherein the second user interface portion (i) includes a grouping of first labels associated with respective ones of the first object tracks and a grouping of second labels associated with respective ones of the second object tracks (ii) and is configured to receive user inputs associating a first label with a second label.

10. The method of claim 4, further comprising:
    obtaining initial association data that specifies one or more associations, each association associating a respective first object track with a respective second object track, wherein:
    the second user interface portion displays data identifying each of the one or more associations and is configured to receive user inputs modifying each of the one or more associations.

11. The method of claim 4, wherein the first user interface portion includes a first user interface element that, when selected by the user, causes the first user interface portion to display a representation of a sensor measurement captured by the second sensor and that (i) corresponds temporally to the image being displayed in the first user interface portion and (ii) identifies the positions in the representation of the sensor measurement of the one or more second objects that are identified as being depicted in the image being displayed in the first user interface portion.

12. The method of claim 11, wherein the representation of the sensor measurement captured by the second sensor is a top-down representation of the sensor measurement.

13. The method of claim 4, wherein the user interface presentation data causes the first user interface portion to, in response to a received user input interacting with a representation of a particular second object, display a distance from the second sensor to the position of the second object in a corresponding sensor measurement.

14. The method of claim 4, wherein the first user interface portion displays positions of first and second objects that have already been associated with another object in a view that is different from a view in which the first user interface portion displays positions of first and second objects that are not associated with another object.

15. The method of claim 4, wherein the user interface presentation data causes the first user interface portion to, in response to a user input specifying one or more second objects, display a respective contour representation for each of the one or more sensor objects that represents a respective contour of the second object that is derived from a corresponding sensor measurement captured by the second sensor.

16. A system comprising one or more computers and one or more storage devices storing instructions that when executed by the one or more computers cause the one or more computers to perform operations comprising:
    obtaining a sequence of images of a scene in an environment;
    obtaining first object track data that specifies one or more first object tracks in the sequence of images that each correspond to a different first object and that have been generated by labeling sensor measurements generated by a first sensor;
    obtaining second object track data that specifies one or more second object tracks in the sequence of images that each correspond to a different second object and that have been generated by labeling sensor measurements generated by a second sensor that is different from the first sensor;
    generating user interface presentation data that, when presented on a user device, causes the user device to display a user interface that:
        displays the images in the sequence of images and data identifying the first and second object tracks, and
        is configured to receive user inputs that associate first object tracks with second object tracks; and
    providing the user interface presentation data for presentation on the user device.

17. The system of claim 16, the operations further comprising:
    receiving an indication of a user input submitted in the user interface that associates a particular first object track with a particular second object track; and
    in response, generating data indicating that a particular first object corresponding to the particular first object track and a particular second object corresponding the particular second object track are a same object.

18. The system of claim 16, wherein:
    each first object track identifies respective positions of the corresponding first object in one or more of the images, and
    each second object track identifies respective positions of the corresponding second object in one or more of the images.

19. The system of claim 18, wherein the user interface includes:
    a first user interface portion that, when an image in the sequence is selected for presentation by the user, displays the selected image and identifies the respective positions in the image of (i) any of the one or more first objects that are identified as being depicted in the selected image by the first object track data and (ii) any of the one or more second objects that are identified as being depicted in the selected image by the second object track data; and
    a second user interface portion that is configured to receive the user inputs associating first object tracks and second object tracks.

20. One or more non-transitory computer-readable media storing instructions that when executed by one or more computers cause the one or more computers to perform operations comprising:
    obtaining a sequence of images of a scene in an environment;
    obtaining first object track data that specifies one or more first object tracks in the sequence of images that each correspond to a different first object and that have been generated by labeling sensor measurements generated by a first sensor;
    obtaining second object track data that specifies one or more second object tracks in the sequence of images that each correspond to a different second object and that have been generated by labeling sensor measurements generated by a second sensor that is different from the first sensor;
    generating user interface presentation data that, when presented on a user device, causes the user device to display a user interface that:
        displays the images in the sequence of images and data identifying the first and second object tracks, and
        is configured to receive user inputs that associate first object tracks with second object tracks; and
    providing the user interface presentation data for presentation on the user device.

* * * * *